March 12, 1957 E. P. SENNE 2,784,848
COLLAPSIBLE DISAPPEARING RADIAL ARM MECHANISM
Filed June 10, 1953 2 Sheets-Sheet 1
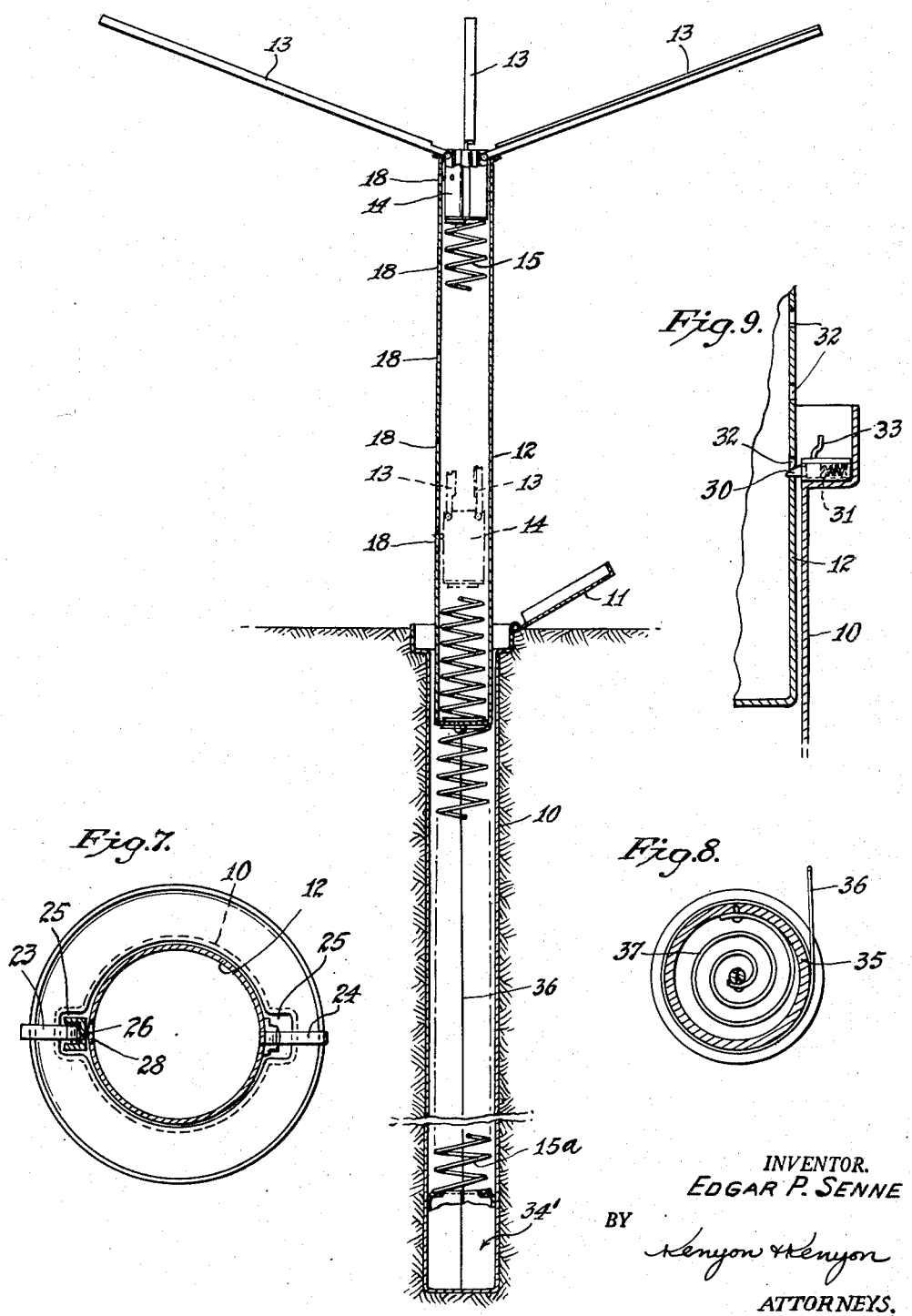
INVENTOR.
EDGAR P. SENNE
BY
Kenyon & Kenyon
ATTORNEYS.

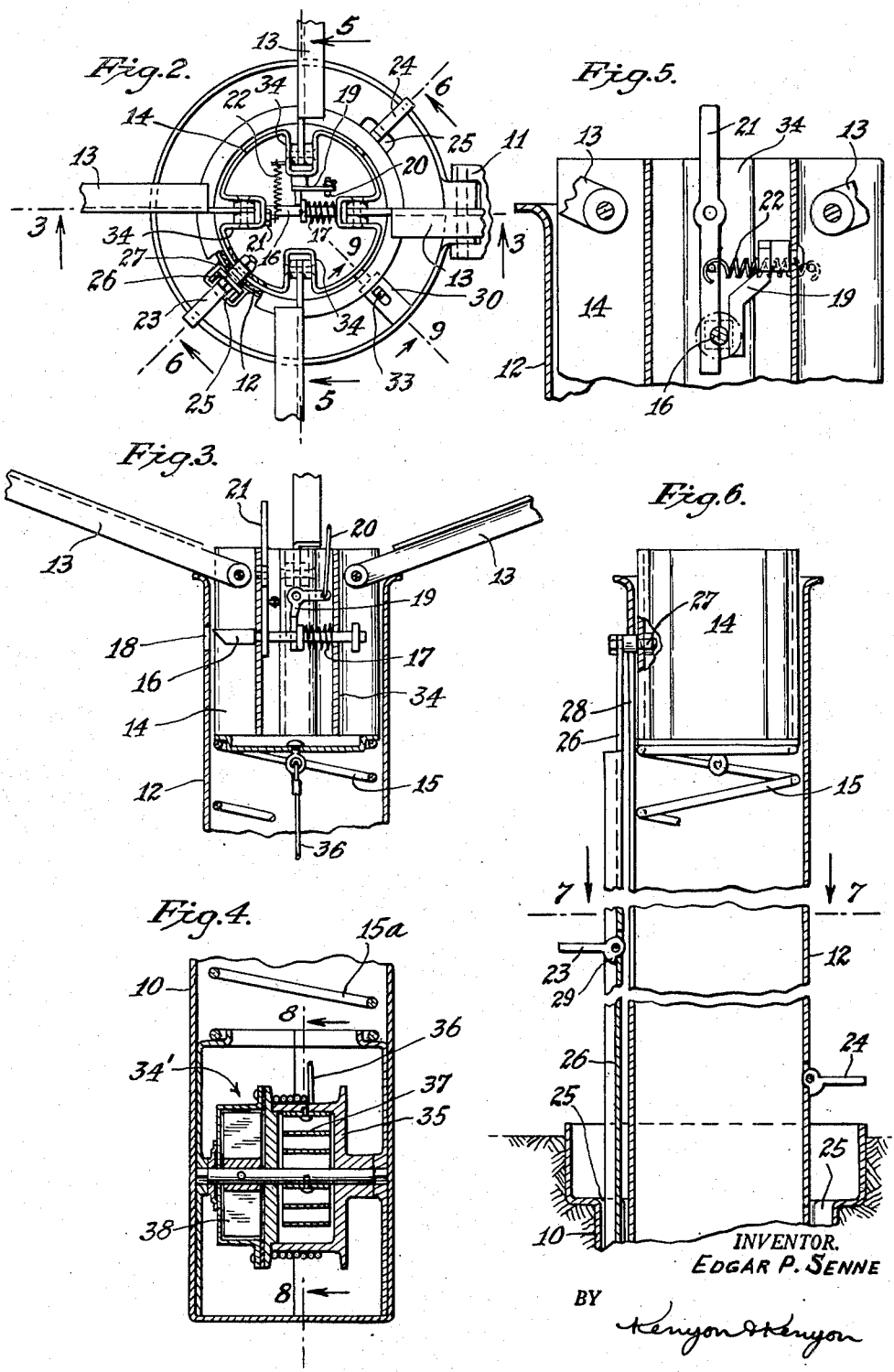

2,784,848

COLLAPSIBLE DISAPPEARING RADIAL ARM MECHANISM

Edgar Peter Senne, County of Suffolk, N. Y.

Application June 10, 1953, Serial No. 360,772

4 Claims. (Cl. 211—178)

The object of this invention is to provide a collapsible, disappearing, radial arm mechanism useful for numerous domestic and other purposes. A good example of its usefulness is in clothes-dryers which can be made to collapse and disappear into a housing in the ground in the yard of an ordinary domestic establishment. It might similarly be used for umbrella and like purposes.

The invention is best illustrated by the embodiment shown in the accompanying drawings and described in the following text. The Fig. 1 of the drawing is a vertical cross-section through the entire mechanism, and Fig. 2 is a partial top-plan view showing some of the internal mechanisms. Figs. 3 and 4 (along line 3—3, Fig. 2) are views similar to Fig. 1, showing in greater detail some of the internal mechanisms, including a dash-pot mechanism at the bottom for limiting the speed at which the device opens up. Fig. 5 is a view along the line 5—5 of Fig. 2, while Fig. 6 is a view along the line 6—6 of Fig. 2. Fig. 7 is a horizontal cross-section, as seen along the line 7—7 of Fig. 6. Fig. 8, taken along the line 8—8 of Fig. 4, illustrates a further detail of the dash-pot mechanism. Fig. 9 illustrates a ratchet mechanism useful in collapsing the device.

Referring to the drawings, the structure comprises generally a hollow shaft 10 embedded in the ground, as shown, and provided with a cover 11 for protection against rain and dirt when the device is collapsed. A hollow sleeve 12 is arranged to telescope within the shaft 10 and to be a support for a plurality of arms 13 which may be retracted within the sleeve 12 when the device is collapsed or which may be spread in a spoke-like pattern to serve as clothes-dryers or the like when the device is fully opened (the position shown in Fig. 1). For the purpose, the arms 13 are journaled in a plunger 14 which can be moved up and down the interior of sleeve 12, as will be explained in detail later. A spiral, compression spring 15 normally biases the plunger upward so that it normally tends to open the mechanism and spread the arms; similarly, a compression spring 15a normally tends to bias the sleeve 12 to its upward or outward position above the ground so that the outspread arms are supported at some distance above the ground. When the mechanism is not in use, it is caused to disappear into the ground by retracting the sleeve 12 completely into the shaft 10 and at the same time retracting the plunger 14 to the bottom of sleeve 12 in which case the arms 13 withdraw within the sleeve 12 and rest there in longitudinal alignment therewith.

In order to facilitate the collapsing of the device by the ordinary domestic user, it is arranged so that both the plunger 14 and the sleeve 12 may be pushed down in steps, that is, in a series of short movements of several inches length. For example, the user may retract the plunger 14 completely into the sleeve 12 by a succession of pushes in which the plunger 14 is held down at the end of each push so that the user need not retract the plunger in one complete stroke from the top to the bottom of sleeve 12. Having done that, the user may similarly retract the sleeve 12 by a series of pushes into the shaft 10. Of course, the retractions of plunger 14 and sleeve 12 might occur simultaneously. For the purpose of these retractions, there are provided the ratchet-like mechanisms presently to be described.

Referring particularly to the Figs. 2 and 3, it will be seen that the plunger 14 has mounted thereon a ratchet-like latch 16 which is biased to the left, as seen in Figs. 2 and 3, by a spring 17 so that it may engage in any of a series of holes 18 spaced up and down the length of the sleeve 12 in the path of the latch 16. From this, it will be seen that as the user pushes the plunger 14 downward, as by grasping the arms 13, the latch 16 will snap into holes 18 in a ratchet-like manner as the plunger proceeds downward. The user may, therefore, push the plunger downward in long or short strokes, as desired, and the latch 16 will hold it at the bottom end of each stroke.

Of course, when it is desired to open the mechanism, the latch 16 must be released and for that purpose, there is provided a bell-crank 19 which may be rotated by a pull on a chain or cord 20 extending to the top of the sleeve 12. Counterclockwise rotation of the bell-crank 19, as seen in Fig. 3, will withdraw the latch away from the wall of sleeve 12 so that it cannot engage the holes 18; and the latch is held there by the lock-arm 21 which is biased by the spring 22 toward the latch 16 and snaps into a suitable groove therein so as to hold it in its retracted position. The locking action of arm 21 on the latch 16 may be released by manual pressure on the top of the arm 21, and that, of course, will be done when it is desired to collapse the mechanism and permit the latch 16 to function during retraction, as previously described. The arm 21 will be at the top of the mechanism when it is desired to perform the unlocking action, and, therefore, it will be readily accessible to manual operation.

To facilitate the retraction of the plunger 14, there is provided a pedal mechanism, illustrated by the disappearing pedals 23 (Fig. 6). Before going into detail on this pedal mechanism and the similar pedal mechanisms 24 for retracting the sleeve 12 within the shaft 10, it is well to note some further features of construction of the sleeve 12 and shaft 10. Referring particularly to the Fig. 7 which is a cross-section of the sleeve 12 and the shaft 10, it will be noted that the shaft 10 has two diametrically opposite guide-channels 25 of U-shaped cross-section which are actually integral parts of the wall of the shaft 10. Correspondingly, the sleeve 12 has, at least, on the left-hand side—as seen in Figs. 6 and 7—a rib 26 of U-shaped cross-section, the U extending in the opposite direction to that of the left-hand channel 25 into which it fits. Thus, it will be seen that the rib 26 slides up and down within the left-hand channel 25, the two acting as a guide mechanism for the sleeve 12 and preventing its rotation about its own axis. The rib 26 is not affixed to the sleeve 12, but rather to the plunger 14—as indicated by the bolt mechanism 27 in Fig. 6. In other words, the rib 26 slides up and down with the plunger 14 and for that purpose, there is provided a slot 28 longitudinally in the sleeve 12, so that the bolt mechanism 27 may extend through the sleeve 12 and yet move with respect to the sleeve 12, while the plunger 14 and the rib 26 are moving up and down.

The pedal mechanism 23 is in the nature of a rotary flap which can be folded out of the way against the inner wall of the rib 26 when the mechanism is collapsed or rotated to the position shown in Fig. 6 where it is perpendicular to the rib 26. It is held in that position by the catch 29 which rests against the inner wall of the rib 26. It will be seen that when this pedal is in the outer position, shown in Fig. 6, the user may step on it or push it manually in order to exert downward pushes on the plunger 14 through the medium of the rib 26 for the step-by-step retraction movement previously described. When the pedal 23 reaches the shaft 10, it is automatically rotated upward (clockwise, as seen in Fig. 6) by contact with the shaft 10; thus, it is folded out of the way against the inner wall of the rib 26 by the collapsing movement. A number of these pedals 23 may be provided, if desired. The pedal mechanism 24 for retracting the sleeve 12 into shaft 10 is quite similar. It differs only in that it is connected directly to the sleeve 12, rather than to the plunger 14—as was the case with the pedal 23.

In order that the sleeve 12 may be pushed downward in a step-by-step manner—similar to that of the plunger 14—without the necessity of a continuous, single push from top to bottom, the latch mechanism of Fig. 9 may be employed. Here, a latch 30 is biased by a spring 31 into contact with the wall of the sleeve 12 and tends to fall into any one of a series of holes 32 spaced up and down the length of the sleeve 12 in the path of the ratchet 30, as was the case with the holes 18 and the latch 16. It will be apparent that as the user pushes the sleeve 12 downward in short or long strokes as desired, the ratchet-like latch 30 will hold the sleeve at the bottom of each stroke so that the user may rest between strokes, if desired. A handle 33 is provided so that the latch 30 may be withdrawn manually, or otherwise, when it is desired to let the mechanism open up under the action of the springs 15 and 15a. It may be desirable to provide a latch or lock mechanism, similar to this, to lock the sleeve 12 in its upper, open position so that the mechanism does not tend to close or collapse under the weight of any load placed upon it.

It will be noted that the arms 13 are mounted on the plunger 14 by journaling them in the U-shaped members 34, as seen in Figs. 2 and 3.

The motions of the user in collapsing the device and retracting it into the ground have already been described. The motions of the user for opening it are much simpler because of the springs 15 and 15a. All the user need do is open the cover 11 and release the latch 30 with the handle 33. Thereupon, the springs 15 and 15a will automatically push the sleeve 12 to the upward position and the plunger 14 to its upward position so that the arms 13 may fall outward into their radial, spoke-like pattern. Since it may be desirable to use relatively strong springs 15 and 15a, it may also be desirable to insure that this automatic opening movement does not occur too rapidly, to the danger of the user. To that end, the dashpot mechanism 34' is provided. It comprises a suitable drum mechanism 35 upon which a cord 36 attached to the plunger 14 may be wound. A spring 37 within the drum winds the cord on the drum as the mechanisms are being collapsed in the manner previously described. A dashpot mechanism, comprising the vanes 38 rotating in a suitable body of oil, provides enough resistance to rotation of the drum, to insure that the sleeve 12 and the plunger 14 cannot rise too rapidly; and, of course, the spring 37 adds some resistance to the same end.

I claim:

1. In a collapsible radial arm mechanism, a tube having an open upper end, a plunger slidable within the tube and having radial arms pivotally secured thereto, resilient means urging said plunger towards the open end of the tube, a latch mounted on the plunger, a spring, tensioned to cause said latch to engage ratchet-means secured to said tube, means operable from the open end of said tube to disengage said latch from said ratchet-means when the plunger is remote from the open end of said tube, and a manually releasable lock carried by the plunger to secure said latch in disengaged position against the tension of said spring.

2. In a collapsible radial arm mechanism, a tube having an open upper end, a plunger slidable within the tube and having radial arms pivotally secured thereto, resilient means urging said plunger towards the open end of the tube, a latch mounted on the plunger, a spring of the tube, a latch mounted on the plunger, a spring tensioned to cause said latch to engage ratchet-means secured to said tube, means operable from the open end of said tube to disengage said latch from said ratchet-means when the plunger is remote from the open end of said tube, and means carried by the plunger and releasable when the plunger has moved to the open end of the tube to secure said latch in disengaged position.

3. In a collapsible radial arm mechanism, a tube having an open upper end, a plunger slidable within the tube and having radial arms pivotally secured thereto, resilient means urging said plunger towards the open end of the tube, a latch mounted on the plunger, a spring tensioned to cause said latch to engage ratchet-means secured to said tube, means operable from the open end of said tube to disengage said latch from said ratchet-means when the plunger is remote from the open end of said tube, a manually releasable lock carried by the plunger to secure said latch in disengaged position against the tension of said spring, and damping mechanism to check the speed of movement of said plunger towards the open end of the tube under the influence of said resilient means.

4. A collapsible radial arm mechanism comprising a hollow shaft adapted to be fixed in the ground, an open-ended tube slidable within said hollow shaft from fully-retracted to fully-extended positions, a plunger slidable within the tube and having radial arms pivotally secured thereto, a main spring tensioned between a fixed support at the lower end of the hollow shaft and said plunger to urge said plunger towards the open end of said tube, latching means to secure the plunger and tube against the tension of said main spring, and damping mechanism interconnected between said plunger and fixed support to check the speed of movement of said plunger under influence of said spring.

References Cited in the file of this patent

UNITED STATES PATENTS

| | | |
|---|---|---|
| 556,798 | Ashton | Mar. 24, 1896 |
| 857,714 | Bougher | June 25, 1907 |
| 1,340,494 | Niles | May 18, 1920 |
| 1,683,351 | Herr | Sept. 4, 1928 |
| 2,654,484 | Win et al. | Oct. 6, 1953 |